(12) United States Patent
Raisch

(10) Patent No.: US 8,084,877 B1
(45) Date of Patent: Dec. 27, 2011

(54) METHODS AND DEVICES FOR CONVERTING WAVE ENERGY INTO ROTATIONAL ENERGY

(76) Inventor: Netanel Raisch, Psagot (IL)

( * ) Notice: Subject to any disclaimer, the term of this patent is extended or adjusted under 35 U.S.C. 154(b) by 0 days.

(21) Appl. No.: 13/159,419

(22) Filed: Jun. 14, 2011

(51) Int. Cl.
*F03B 13/20* (2006.01)
(52) U.S. Cl. .......................................... 290/53; 290/42
(58) Field of Classification Search .................... 290/42, 290/53; 60/507; 405/75, 76
See application file for complete search history.

(56) References Cited

U.S. PATENT DOCUMENTS

| | | | | |
|---|---|---|---|---|
| 3,200,255 A | * | 8/1965 | Masuda | 290/42 |
| 7,245,041 B1 | * | 7/2007 | Olson | 290/53 |
| 2010/0032950 A1 | * | 2/2010 | Akervoll | 290/53 |
| 2010/0102563 A1 | * | 4/2010 | Akervoll | 290/53 |

* cited by examiner

*Primary Examiner* — Tho D Ta

(57) ABSTRACT

The invention discloses devices and methods for converting wave energy to rotational energy. Specifically, the invention allows for two or more flotation elements to move in opposite directions in response to a wave contacting a wave energy transducer according to embodiments of the present invention. Motion of the flotation elements leads to rotation of associated wheel assemblies, thus allowing for generation of rotational energy and by extension, electricity.

20 Claims, 15 Drawing Sheets

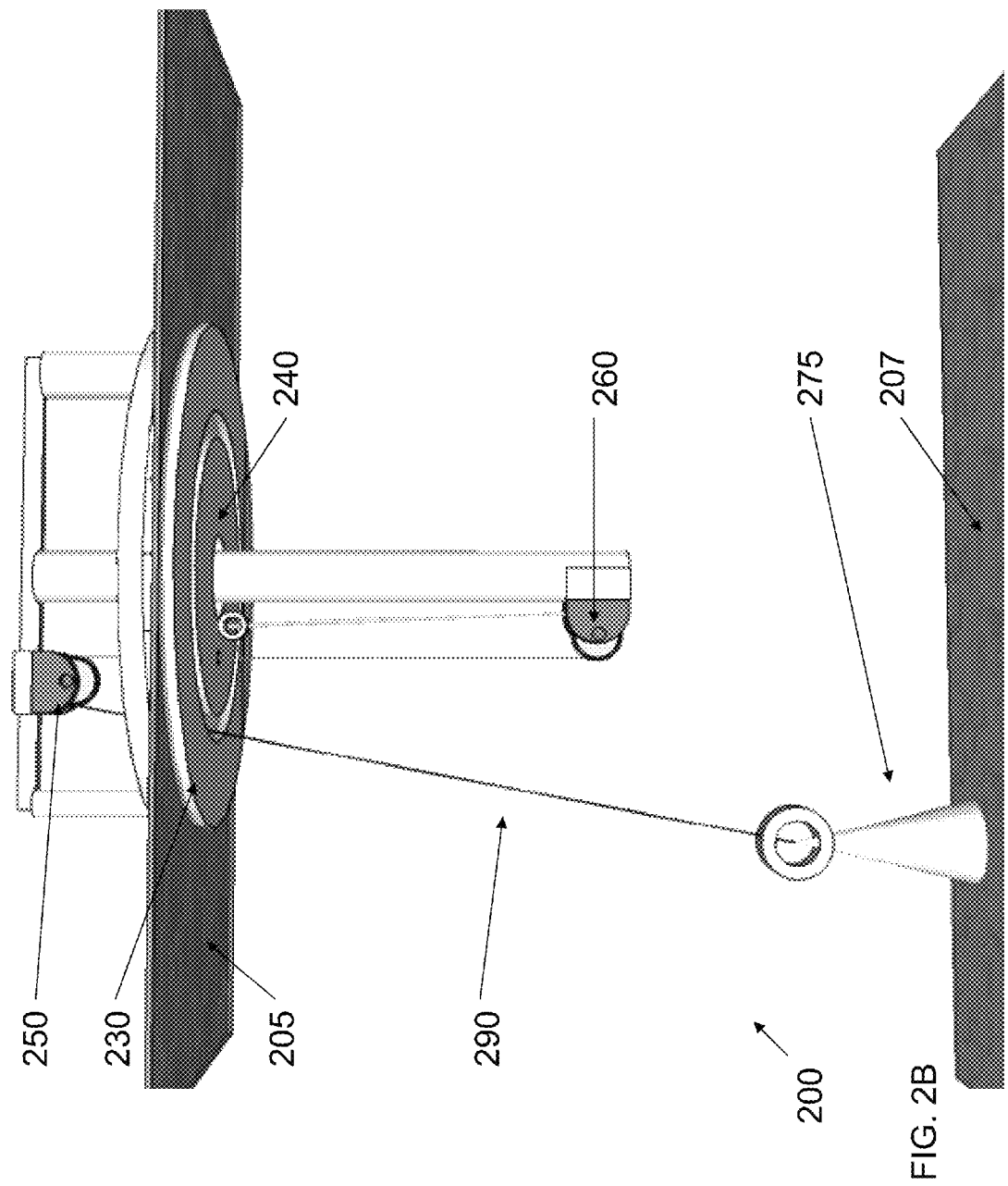

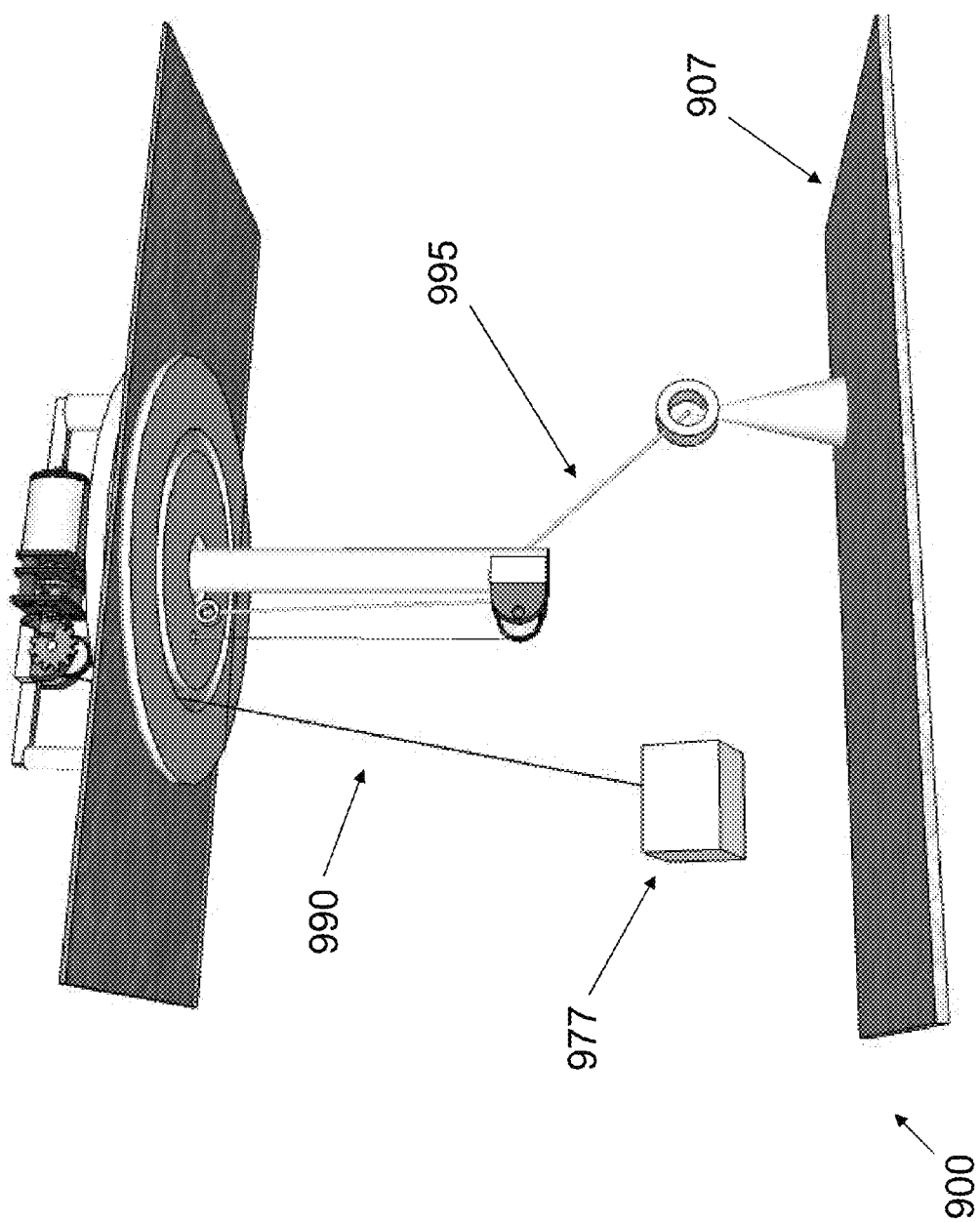

providing a buoy having a first flotation element including an upper wheel assembly and a lower wheel assembly, the lower wheel assembly being below water level, a second flotation element, smaller than and motion independent of the first flotation element and, a cable, wherein the cable is attached at a first end to the second flotation element and is attached at a second end to a water bed, and wherein the cable is adapted to pass above and rotate said upper wheel assembly and pass beneath and rotate the lower wheel assembly

placing the buoy into a body of water so that the first flotation element and the second flotation element are on the surface of the body of water

anchoring the buoy through the cable to the bed of said body of water

allowing action of waves to raise the first flotation element and concomitantly sink the second flotation element, wherein the motion of the second flotation element allows for the rotation of the upper wheel assembly and the lower wheel assembly

allowing action of the waves to lower the first flotation element and concomitantly raise the second flotation element, wherein the motion of the second flotation element allows for the rotation of the upper wheel assembly and the lower wheel assembly.

FIG. 10

METHODS AND DEVICES FOR CONVERTING WAVE ENERGY INTO ROTATIONAL ENERGY

FIELD AND BACKGROUND OF THE INVENTION

The present invention, in some embodiments thereof, relates to devices and methods for efficiently converting energy associated with water waves into rotational energy, but not exclusively, to methods for effectively producing electrical energy from wave action.

There is a tremendous push in the world toward "renewable" energy sources. While solar and wind have been of the dominant varieties of alternative electricity sources, waves from the oceans could power a significant portion of the world electrical demand (see for example: http://peswiki.com/index.php/Directory:Ocean_Wave_Enemy). As with any form of energy supplied to the world public, wave-based electricity must be price competitive with other energy sources. Creating electricity is not the same as providing electricity in quantities and at prices that allow for its use in the electrical grid.

Wave-based electrical generators have been prepared and different versions have been used in sea trials, though none is commercially in use. While each system has unique features as well as performance specifications, most use the same basic physics of a wave driving either a linear or rotary element to eventually create electricity.

U.S. patent application Ser. No. 12/221,407 to Kim, et al describes electricity generation from the ocean wave by use of mechanical systems, submerged or on surface, collecting energy day and night regardless weather condition in a way similar to the way of collecting energy by use of solar panels or wind mills, without contacting the salty ocean water. The principal mechanism invented is as follows. Swinging of a heavy mass due to the ocean wave generates torque that sways gear wheel in clockwise or counterclockwise, thus transmitting the torque energy to two gear wheels that separate clockwise swing and counterclockwise swing via two sets of spring-piston clutching system and by use of gear chain, either converting clockwise swing to counterclockwise swing or vise versa such that the back and forth motion of the mass transforms into unidirectional rotation that rotates the rotor of electricity generator.

U.S. patent application Ser. No. 12/248,575 to Rasmussen teaches systems and methods are disclosed for harnessing wave energy. In one embodiment, a wave energy conversion device comprises a buoyant component connected to a generator such that wave energy is transferable from the buoyant component to the generator. A restricting mechanism connected with the buoyant component, is configured to selectively restrict the buoyant component from rising strictly along with passing waves. The restricting mechanism may be selectively released at an optimal time during a passing wave. In some embodiments, a system may include an array of wave energy conversion devices and a communications network. The communications network may allow for each of the buoyant components in the array to be released at an optimal time in sequential fashion.

U.S. patent application Ser. No. 12/867,431 to Sidenmark describes a wave energy converter including a buoy and a transmission unit. In the transmission unit there is a driveshaft, which is driven to rotate either when the buoy rises or sinks, yet always in the same direction. The driveshaft is mechanically coupled to one of the rotating parts of an electric generator and drives this to generate electric current. Further on there is an energy accumulation device, which is also coupled to the driveshaft to accumulate energy when the buoy rises or sinks and the driveshaft rotates and which is then used to drive the generator at the other of the rising and sinking motions. The coupling between the energy accumulation device and the driveshaft can go by the generator's second rotatable part, the air gap between the generator's parts and the generator's first part. The coupling over the air gap gives a torque, which drives the second part to rotate along and which also counteracts the rotation of the driveshaft. The generator's second part is driven by the energy accumulation device to rotate in the other direction, when the torque from the driveshaft does not exceed the counteracting torque.

U.S. Pat. No. 4,568,836 to Reenberg teaches an apparatus for converting wave energy to electrical energy in a sea environment comprises a flotation duck anchored to the sea bottom and a turbine assembly pivotally connected thereto comprising an air chamber partially filled with liquid and/or granular particles having a turbine mounted on the upper portion thereof. The turbine is either self-rectifying or with a flap valve controlled entrance to the air chamber. A generator is coupled to the turbine and driven thereby. In operation, the motion of the waves causes the liquid and/or granular particles to compress the air within the chamber which is then used to drive the turbine. The spent air is fed back into the air chamber from the turbine as wave motion continues. In alternate embodiments the turbine generator assembly is mounted to the upper portion of an air chamber open to the sea on the bottom in an apparatus which rotates about a fixed or stable central axis. Gearing arrangements to drive the generator either alone or in combination with a liquid or air turbine drive are also disclosed. Compression of the air within the chamber or liquid, as the case may be, drives the turbine. Multiple assemblies may be readily coupled together to generate electrical energy in commercially practical quantities.

U.S. patent application Ser. No. 12/698,779 to Bender describes a power generating device comprising a weight suspended from a buoy via a zip-line and at least two gears disposed on said zip-line which are coupled to drives shafts, which in turn are couple to electric generators. The device converts the mechanical power of oscillating ocean waves into electricity.

U.S. Pat. No. 7,012,340 to Yi teaches an ocean wave energy conversion apparatus including a float adapted to ride on the surface of the ocean in reciprocal vertical motion in response to ocean wave front action and a lever adapted to ride on the surface of the ocean. The lever has one end coupled to the float. A fulcrum pivotally supports the lever. A magnet is coupled to the other end of the lever. Parallel stator cores having electric coils wound thereon together with the magnet form a magnetic circuit. Springs are adjacent the magnet and interconnected to the lever and the magnet. A barrier is disposed between adjacent stator cores. The upward motion of the float caused by impact of waves will move the magnet downward by the lever and compresses the springs. Downward motion of the float will move the magnet upward by the lever and expand the springs. Repeated movement of the magnet will induce a voltage in the electric coils.

The prior art generally describes production of electrical energy through the movement of weights with concomitant generation of electrical energy.

SUMMARY OF THE INVENTION

It is therefore a purpose of the present invention, in some embodiments, to describe methods and devices for converting wave energy into rotational energy, the rotational energy being, in some embodiments, being further converted to electricity.

The invention includes a device for converting wave energy into rotational energy, including the following: a first flotation element including an upper wheel assembly and a lower wheel assembly, the lower wheel assembly being below water level during action of the device; a second flotation element, smaller than and independent in individual motion of the first flotation element; a chain, wherein the chain is attached at a first end to the second flotation element and is adapted to rotate the lower wheel assembly and transfer change in potential energy of the first floatation element to mechanical rotational energy, and the chain further passing the upper wheel assembly; and, an anchor, wherein the anchor is attached to a second end of the chain and remains effectively unmoved during the action of the device.

In one aspect of the device, the rotational energy is employed in the generation of electricity.

In another aspect of the device, the device is a plurality of devices.

In another aspect of the device, there is additionally a motor being associated with a wheel assembly.

In another aspect of the device, the anchor sits on a water bed.

In another aspect of the device, the anchor is realized as a weight.

In another aspect of the device, there is additionally an electrical cable for dispatching electricity generated by the motor to an electrical grid.

In another aspect of the device, the device is realized as a buoy.

In another aspect of the device, the wheel assembly includes teeth adapted for interaction with the chain.

In another aspect of the device, the rotational energy is employed in water pumping.

In another aspect of the device, the rotational energy is employed in the compression of liquid or gas.

In still another aspect of the device, the device could be part of a raft or ship.

In another aspect of the device, there is additionally an electrical system for local off-grid uses.

In another aspect of device, there is additionally a light and adapted for use as lighthouse or marking buoy.

In another aspect of the device, there is additionally a gear system to convert turns of the wheels to larger turns of a component associated with a motor.

In another aspect of the device, there is a load on a shaft associated with the motor.

In another aspect of the device, there is no load on the motor.

In another aspect of the device, the chain may be comprised of a cable and a chain in a row.

In another aspect of the device, there is further included a system adapted to convert rotation in two directions to rotation in a single predetermined direction rotation.

The invention additionally includes a device for converting wave energy into rotational energy, including the following: a first flotation element including an upper wheel assembly and a lower wheel assembly, the lower wheel assembly being below water level during action of the device; a second flotation element, smaller than and independent in individual motion of the first flotation element; a chain, wherein the chain is attached at a first end to the second flotation element and is adapted to rotate the upper wheel assembly and transfer change in potential energy of the first floatation element to mechanical rotational energy, and wherein the chain is attached at a second end to the sea floor.

In one aspect of the device, the cable is attached to a cement block on the sea floor.

In another aspect of the device, the device is used in the production of electricity.

In another aspect of the device, the device is a plurality of devices.

The invention additionally provides for a method for converting wave energy to rotational motion, including the following: providing a buoy having a first flotation element including an upper wheel assembly and a lower wheel assembly, the lower wheel assembly being below water level, a second flotation element, smaller than and motion independent of the first flotation element and, a cable, wherein the cable is attached at a first end to the second flotation element and is attached at a second end to a water bed, and wherein the cable is adapted to pass above and rotate the upper wheel assembly and pass beneath and rotate the lower wheel assembly; placing the buoy into a body of water so that the first flotation element and the second flotation element are on the surface of the body of water; anchoring the buoy through the cable to the bed of the body of water; allowing action of waves to raise the first flotation element and concomitantly sink the second flotation element, wherein the motion of the second flotation element allows for the rotation of the upper wheel assembly and the lower wheel assembly; and, allowing action of the waves to lower the first flotation element and concomitantly raise the second flotation element, wherein the motion of the second flotation element allows for the rotation of the upper wheel assembly and the lower wheel assembly.

In one aspect of the method, the lower wheel is associated with an electric motor.

In another aspect of the method, there is an additional step of generating electricity from the rotation of the upper wheel assembly and the lower wheel assembly.

In another aspect of the method, there is an additional step of transferring the electricity from the buoy to an electrical grid.

In another aspect of the method, the buoy is realized as a plurality of buoys.

In another aspect of the method, the electricity is used to power the buoy.

In another aspect of the method, the cable is realized as a chain adapted to rotate teeth associated with the upper wheel assembly and the lower wheel assembly.

In another aspect of the method, there is additionally a system placed between the wheel and motor for conversion of two directions of rotation of said wheel to one direction of rotation and could optionally to a higher rate of revolution.

In another aspect of the method, the cable may be comprised of a cable and a chain in a row.

In another aspect of the method, there is additionally included a system adapted to convert rotation in two directions to rotation in a single predetermined direction rotation.

Unless otherwise defined, all technical and/or scientific terms used herein have the same meaning as commonly understood by one of ordinary skill in the art to which the invention pertains. "Buoy", "flotation element", "gear", "cable", "chain", "motor", "anchor", "wheel assembly", "sprocket", and other relevant terms may have their standard meanings as applied in the appropriate arts, unless otherwise defined in the instant invention. A chain may include a chain and a cable.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. It is noted that similar elements in various drawings will have the same number, advanced by the appropriate multiple of 100.

In the drawings:

FIGS. 2B-2D show schematic views of the steps of energy transduction of an embodiment of the present invention;

FIG. 9 shows a schematic representation of an embodiment of the present invention with a weight in place of anchor; and, FIG. 10 shows a flowchart associated with a method of the present invention.

DESCRIPTION OF SPECIFIC EMBODIMENTS OF THE INVENTION

The present invention, in some embodiments thereof, relates to converting the energy associated with waves into rotational energy and, more particularly, but not exclusively, to methods and devices for producing grid-deliverable electricity from wave energy.

Figure 1:
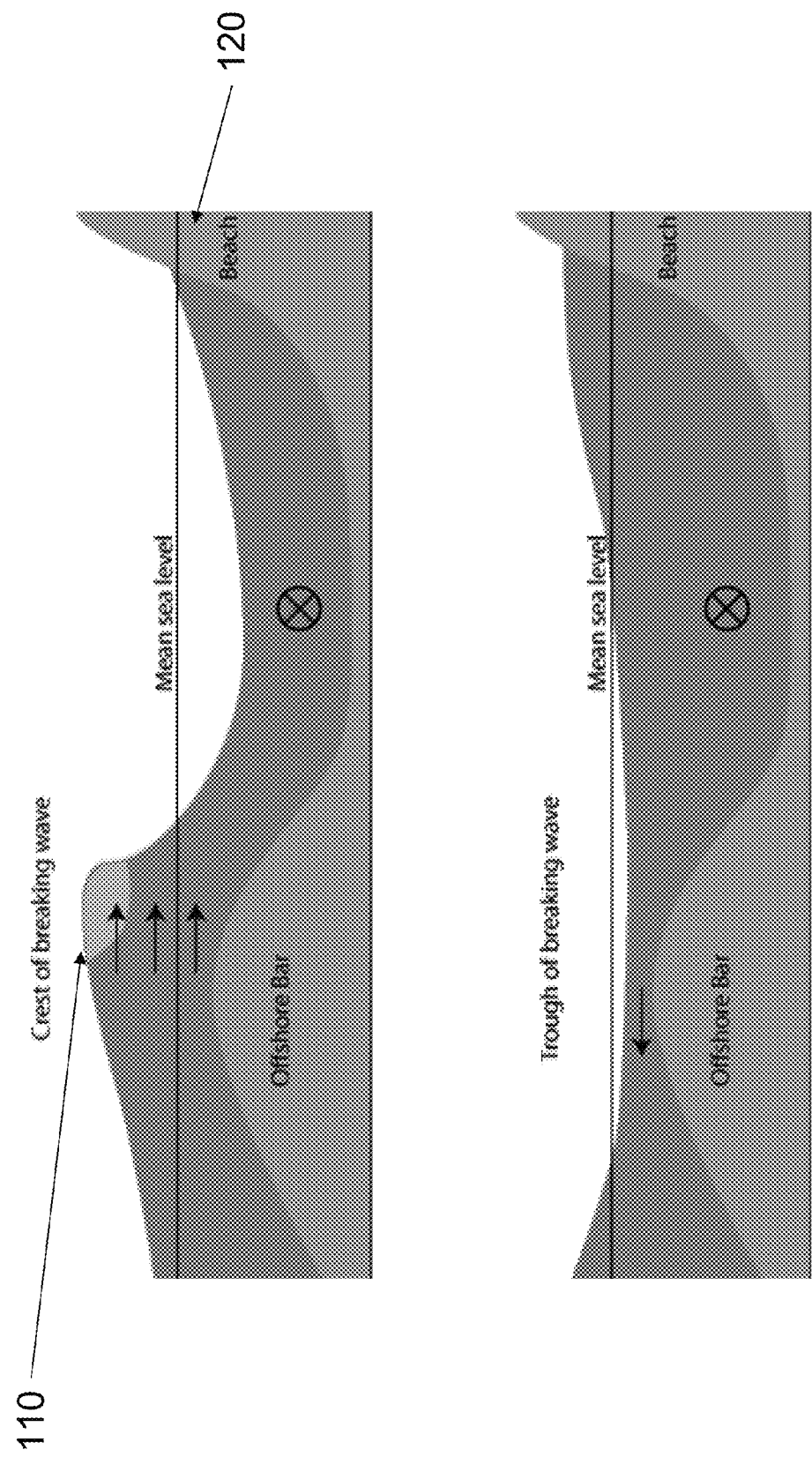
FIG. 1 is a schematic representation of wave energy amenable to conversion to rotational energy.

For purposes of better understanding some embodiments of the present invention, as illustrated in FIGS. 1-10 of the drawings, reference is first made to FIG. 1 which shows a general conceptual schematic for a wave that could be used for production of rotational energy. Water waves have associated energies and are produced by a variety of factors; their intensity and frequency, critical for energy extraction, are related to these factors (http://en.wikipedia.org/wiki/Water_waves):

The great majority of large breakers one observes on a beach result from distant winds. Five factors influence the formation of wind waves:

Wind speed

Distance of open water that the wind has blown over (called the fetch)

Width of area affected by fetch

Time duration the wind has blown over a given area

Water depth

All of these factors work together to determine the size of wind-generated water waves. The greater each of the variables, the larger the waves. Waves are characterized by:

Wave height (from trough to crest)

Wavelength (from crest to crest)

Wave period (time interval between arrival of consecutive crests at a stationary point)

Wave propagation direction

Waves in a given area typically have a range of heights. For weather reporting and for scientific analysis of wind wave statistics, their characteristic height over a period of time is usually expressed as significant wave height. This figure represents an average height of the highest one-third of the waves in a given time period (usually chosen somewhere in the range from 20 minutes to twelve hours), or in a specific wave or storm system. Given the variability of wave height, the largest individual waves are likely to be about twice the reported significant wave height for a particular day or storm.

FIG. 1 shows a wave 110 heading towards a shore 120. The wave has a wave height and groups of waves have an associated wavelength. Energy stored in the moving wave is delivered to shore (often as sound and froth) and then the remaining return wave heads out to sea, thus creating a trough. Energy associated with a wave is most closely associated with wave height, wave speed and the wave period.

First Embodiment

Figure 2A:
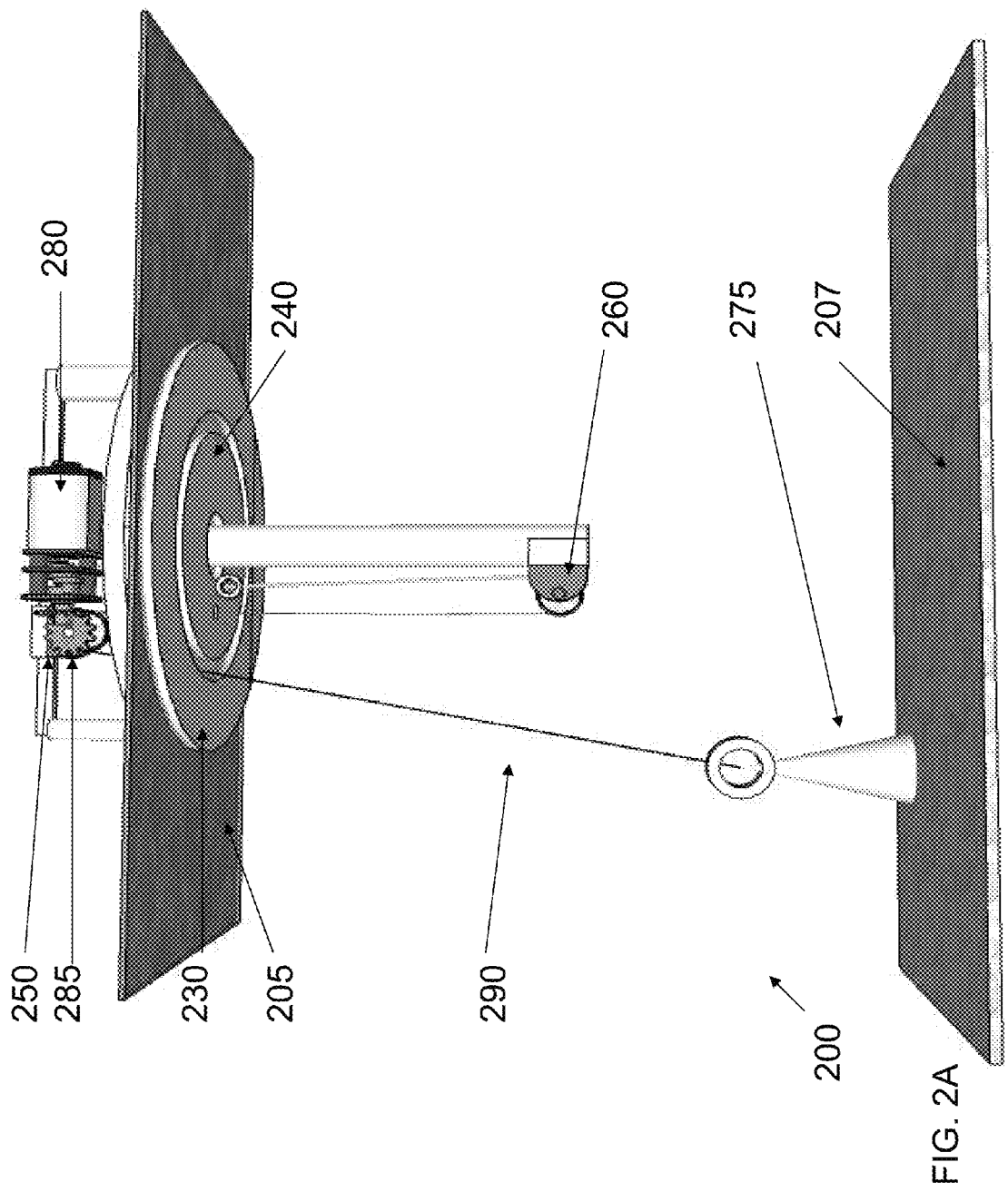
FIG. 2A is a schematic representation of an embodiment of the instant invention.

Attention is turned to FIG. 2A, which shows a schematic view of an embodiment of the instant invention. A wave energy transducer 200 includes a first flotation element 230, a second flotation element 240, an upper wheel assembly 250, a lower wheel assembly 260, and an anchor 275. At a resting state between or in the absence of waves, both flotation elements sit on the face of a body of water 205 where the transducer 200 is present. The wave energy transducer 200 works on a unique concept in which a passing wave (not shown) will necessarily raise the first flotation element 230, as floating materials generally rise with each passing wave. The second flotation element 240 is significantly smaller than the first flotation element 230 and is also attached via a chain or cable 290 to said anchor 275. Thus, when a wave passes the wave energy transducer 200, the first flotation element 230 is raised with the height of the wave, while the smaller second flotation element 240 is transiently sunken into the water. The second flotation element 240 is necessarily sunken into the water due the presence of a cable 290 attached anchor 275 which may rest on a seabed 207. Thus during a wave event, the first flotation element 230 goes up, while concomitantly the second flotation element 240 goes down. The associated chain or cable 290 associated with the second flotation element 240 turns the upper wheel assembly 250 and the lower wheel assembly 260. It is thus through the wave action that wave energy is efficiently converted to rotational energy, primarily associated with the action of the at least two wheel assemblies 250 & 260.

In FIG. 2A, the upper wheel assembly 250 is attached to gear wheels 285 that may be further attached to generator 280. It is noted that either wheel assembly may stand as an independent element, may be associated with an electricity production apparatus or may be associated directly or otherwise with elements that make benefit from rotation of a wheel assembly such as but not limited to a propeller screw or other rotational element.

It is appreciated that additional elements not shown in FIG. 2A may be associated with the wave energy transducer 200. For example, GPS transponder, computer, lighting, armament, power cables, buoy markings, and other elements may optionally be associated with a transducer.

It is stressed that in the present invention, there is no requirement for enormous counterweights which are often used in prior art systems. Rather, the differential size of the at least two flotation elements in association with an anchor or attachment to the ocean floor guarantees that only one flotation element rises with the impending wave, while the other, smaller, flotation element necessarily sinks. The first flotation element 230 is generally at least twice the size of the second flotation element 240, though this ratio can be higher or lower, according to needs of the transducer 200. After the wave has passed, the rotation elements return to their prior positions, namely the first flotation element 230 "comes down" on the back side of the wave crest to the original sea level, while the second flotation element 240 comes back up from the depths to again return to sea level. This return to position also drives the cable 290 through the upper wheel assembly 250 and lower wheel assembly 260, thus guaranteeing additional rotational energy transduction with each passing wave. It is noted that the lower wheel assembly 260 is always beneath sea level, whereas the upper wheel assembly 250 can be either above sea level, at sea level or at times beneath sea level.

Figure 2C:
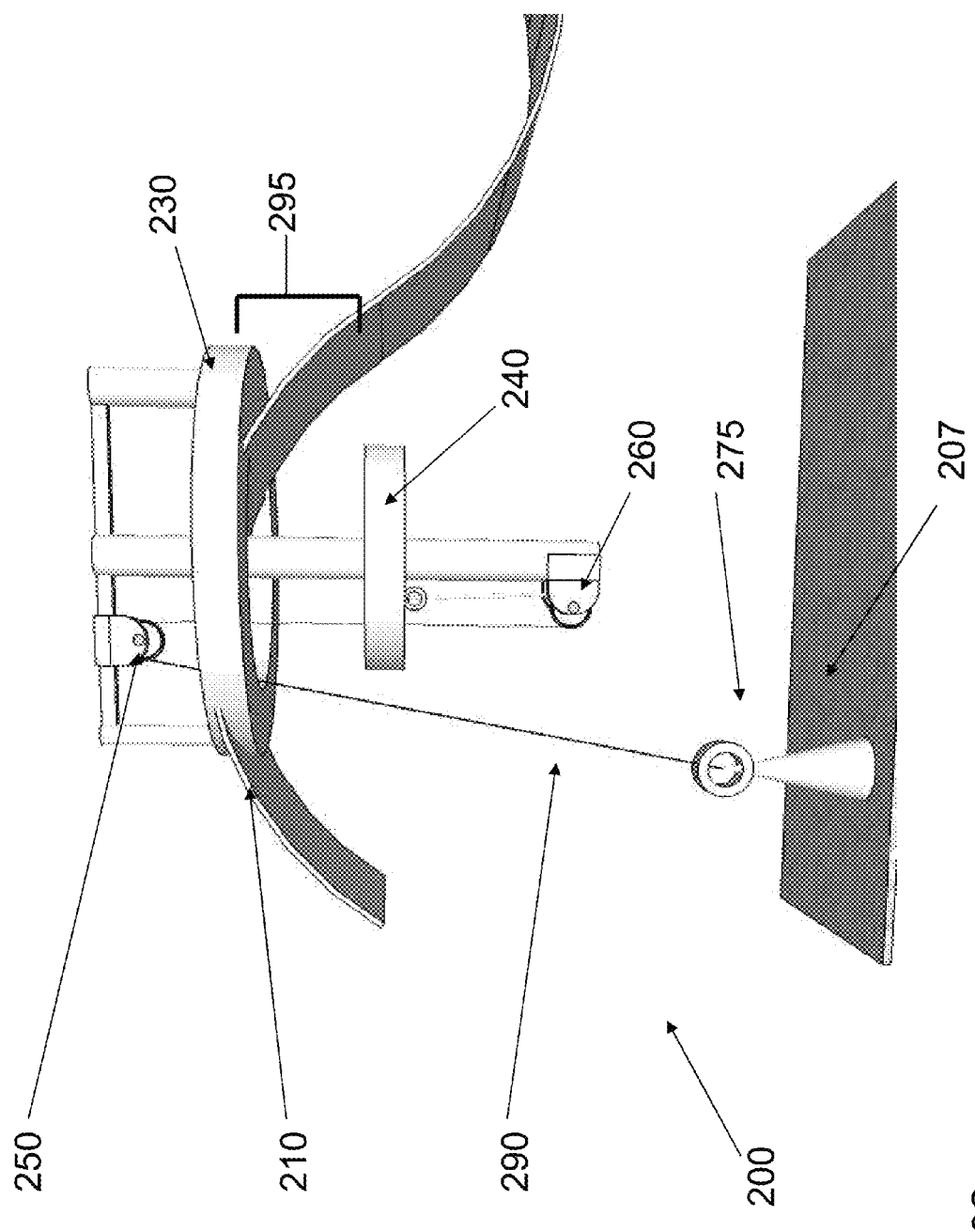
Figure 2D:
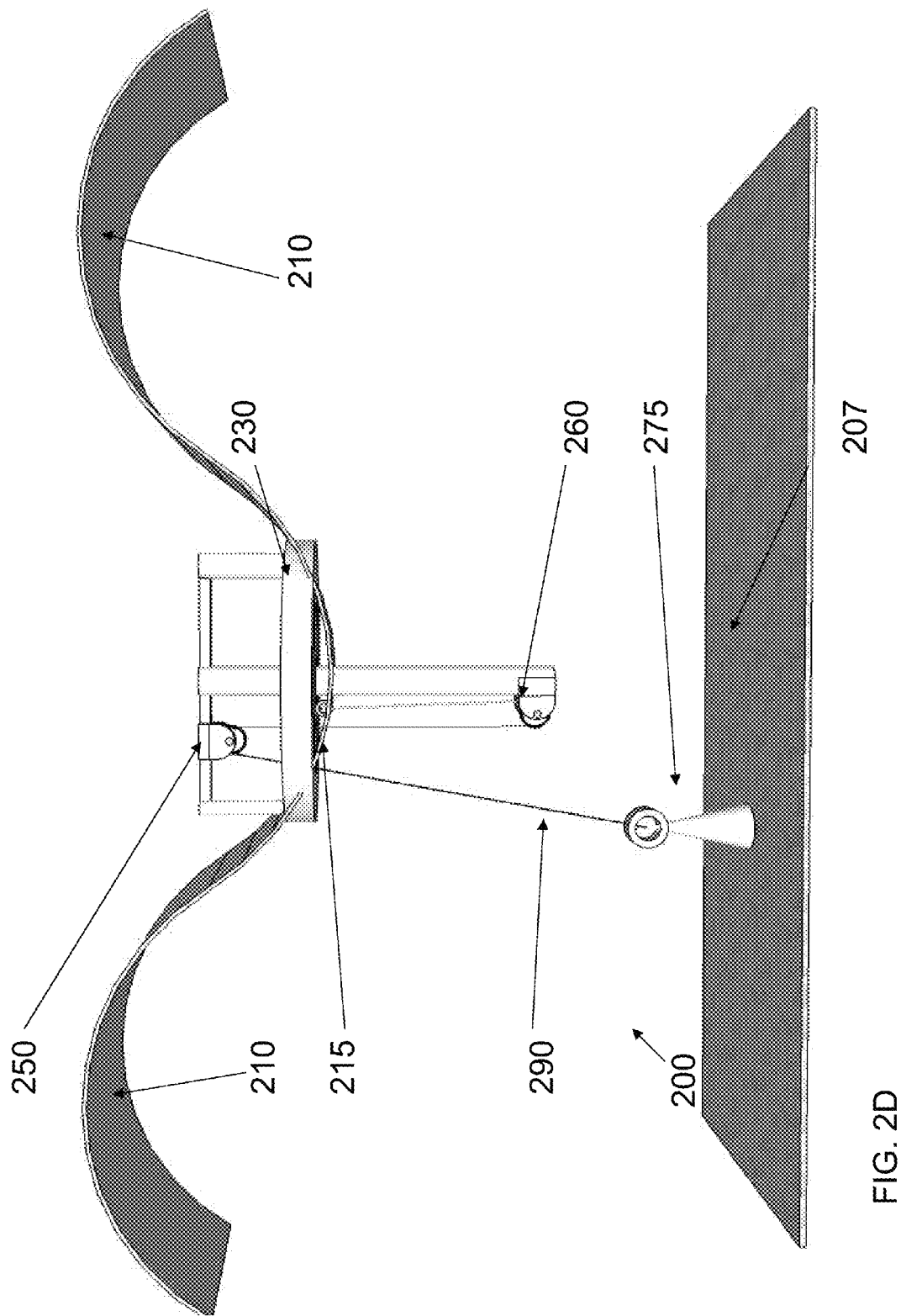

Attention is now turned to FIGS. 2B-2D which show the "lifecycle" of a wave energy transducer 200 in its interaction with a wave. FIG. 2B shows a wave energy transducer 200 at rest in water 205, namely the first flotation element 230 and the second flotation element 240 are at rest, floating in the water. An anchoring element 275 is solidly attached to the ocean floor 207. Cable 290 is attached to said anchoring element 275, passes over upper wheel assembly 250 and under lower wheel assembly 260 before terminating at the smaller second flotation element 240. The cable 290 is of a length to allow the two flotation elements to rest in flat water, with the cable being taught in its disposition.

Attention is turned to FIG. 2C, which shows the wave energy transducer 200 during its interaction with a wave 210, wherein the transducer 200 sits in this view on the wave 210 crest. As expected, the first flotation element 230 rises with the impending wave 210. Under other conditions, the second flotation element 240 would also rise with the wave 210; in the present invention, the intentionally smaller second flotation element 240 necessarily sinks in the wave due to the cable 290 connecting the second flotation element 240 to the anchoring element 275. Thus, as shown in the figure, a separation space 295 is created between the first flotation element 230 and the second flotation element 240. During the time when this separation space 295 is created, cable 290 rotates the upper wheel assembly 250 or a portion thereof and the lower wheel assembly 260 or a portion thereof. Thus, by separating flotation elements according to size and the connection of one flotation element 240 to a fixed anchoring element 275, wave energy is converted to rotational energy in the wheel assemblies. One can use the rotational energy either directly or indirectly to generate electricity or rotational mechanical energy.

Attention is turned to FIG. 2D, which shows the wave transducer 200 after the wave 210 has passed and the wave energy transducer 200 is sitting in a trough 215 between waves 210. The larger first flotation element 230 has gone down and sits on the trough 215. The smaller second flotation element (not visible in figure) has risen from the depths of the sea (or other water source) and is again floating, this time in the trough 215. The movement of the flotation elements towards the trough 215 again turns the upper wheel assembly 250 and lower wheel assembly 260 via the cable 290, this time the rotation being in a direction opposite that when the transducer 200 passed over the wave (see FIG. 2C). The invention thus creates rotational energy both in reaching the crest of a wave 210 and in coming back down into the trough (FIG. 2D, 215) after a wave 210. As discussed in a further embodiment, the rotation of the wheel assemblies in opposite directions during a full wave cycle can be converted to rotation in a single direction and alternatively at a higher rate of rotation through appropriate gears and other elements.

It is noted that the length of the cable may be important for efficient energy conversion by the wave energy transducer. The cable 290 is generally attached to the seabed or other water bed. It is strung through the wheel assemblies and finally attached to the smaller second flotation element. If the cable 290 is too short, the second flotation element will be partially submerged and will have limited travel distance when a wave passes. If the cable 290 is too long, wave passage will not lead to sinking of the smaller flotation element. Thus, cable 290 should be of a length to allow both flotation elements to sit on a calm water surface but should generally not be significantly shorter or longer, unless there is a reason for such a modification. The cable 290 will be adapted to be easily modified for length based on changing water conditions such as tides.

At the end of the process, the energy transducer 200 returns to its starting condition as shown in FIG. 2B.

Second Embodiment

Figure 3:
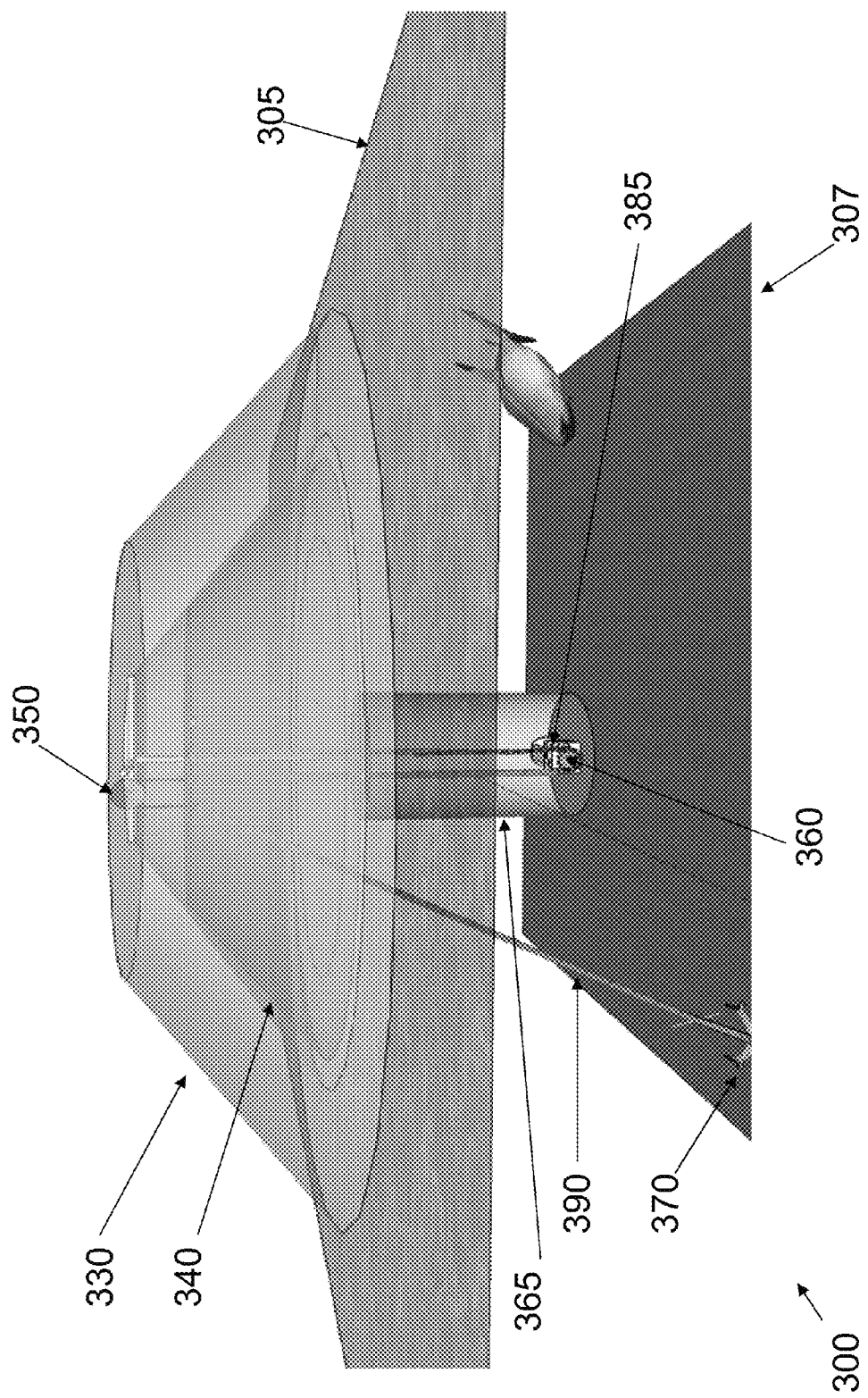
FIG. 3 is a schematic representation of an alternative embodiment of the present invention.

Attention is turned to FIG. 3 which shows a schematic view of an alternative embodiment of the present invention. A wave energy transducer 300 is shown in its resting position when the sea 305 is "flat" and not encountering waves. Conical first flotation element 330 is outside of and significantly larger than conical second flotation element 340. The first flotation element 330 (or alternatively a collection of flotation elements that collectively serve as a first flotation element 330) is generally twice as large as the second flotation element 340, though the specific size ratio may vary according to application and specific embodiment. Anchor 370 rests on sea floor 307 and is attached to cable 390 which is further threaded through upper wheel assembly 350 and lower wheel assembly 360 before being finally attached to said second flotation element 340. As shown in FIG. 3, in its resting state, the wave energy transducer 300 has first flotation element 330 and second flotation element 340 both floating on the sea 305. When a wave passes by (not shown), the flotation elements move in opposite directions: the larger first flotation element 330 rises with the wave, while the smaller, anchored second flotation element 340 is driven into the body of the sea. Cable 390 rotates upper wheel assembly 350 and lower wheel assembly 360, thus converting energy associated with a propagated water wave into rotational energy. The rotating wheel assemblies can be associated with elements that convert the rotational energy into motion, electricity, or any other desired energetic outcome. In FIG. 3, a battery 385 for the wave energy transducer 300 is associated with the lower wheel assembly 360 and powers the device which can serve as a buoy or beacon for shipping.

One will note that the wave energy transducer 300 includes a shaft 365 which houses the lower wheel assembly 360, portions of the cable 390 that run through the lower wheel assembly 360 and the battery 385. The shaft may be open or partially sealed, may float or may either rest or be anchored to the sea floor 307.

Third Embodiment

Figure 4A:
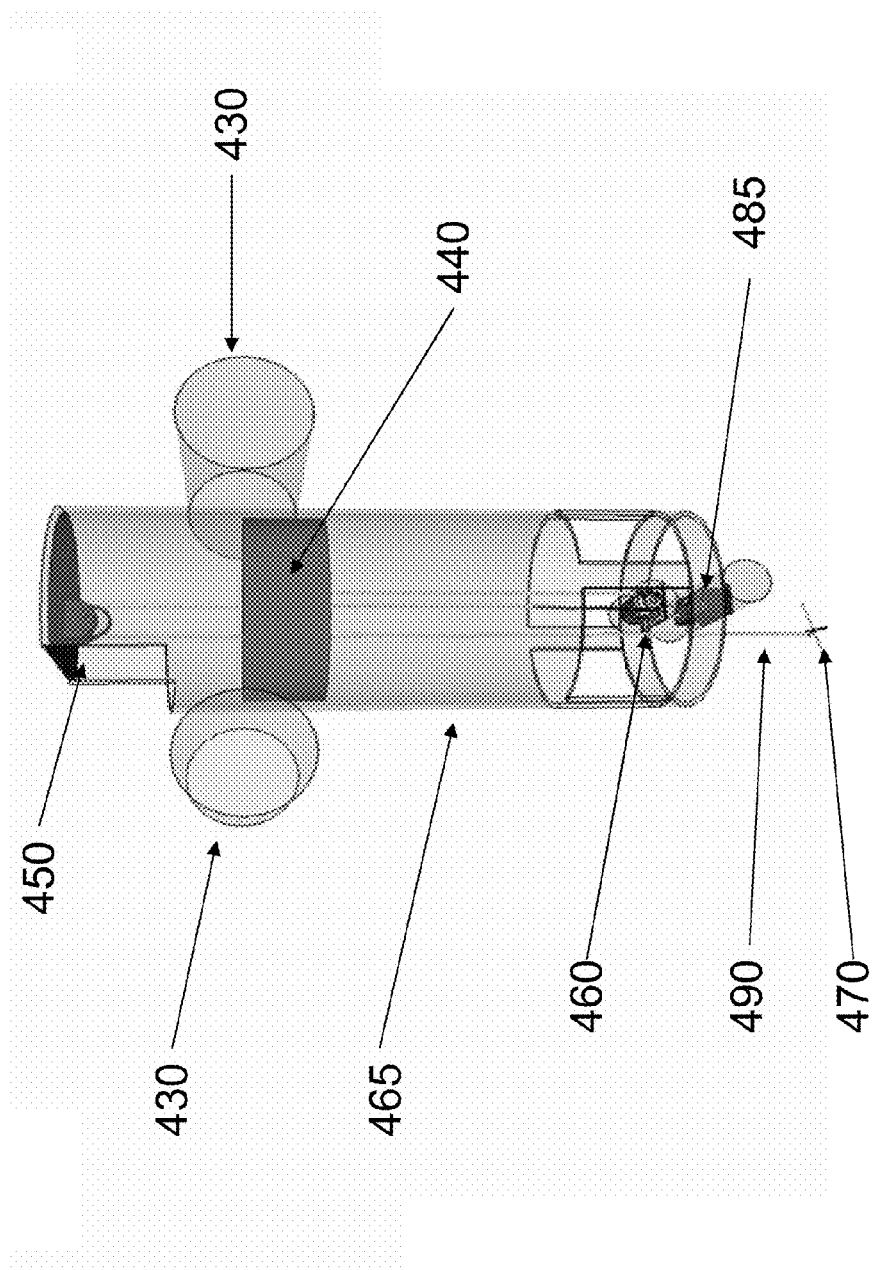
FIGS. 4A & 4B are schematic representations of still another embodiment of a wave to rotational energy device.

Attention is turned to FIG. 4A which shows an alternative embodiment of the present invention. A wave energy transducer 400 includes a shaft 465 that is open to water around it both at its top and its bottom. A second flotation element 440 is located inside the shaft 465 and may move down and up inside the shaft 465 as a function of wave interaction with the transducer 400. The first flotation element 430 is actually realized as two unique flotation elements 430 placed on either side of the partially submerged shaft 465. An anchor 470 is located at the end of cable 490 running from the second flotation element 440 and passing through the upper wheel assembly 450 and lower wheel assembly 460. Cable 490 could alternatively be attached to a large weight or the seabed itself (neither shown in figure). The cable 490 is adapted to pass around both wheel assemblies and to thus rotate the wheel assemblies as second flotation element 440 initially is sunk by wave presence and then elevated after a wave has passed. A battery 485 associated with lower wheel assembly 460 receives energy generated through the wave-specific rotation of lower wheel assembly 460.

Figure 4B:
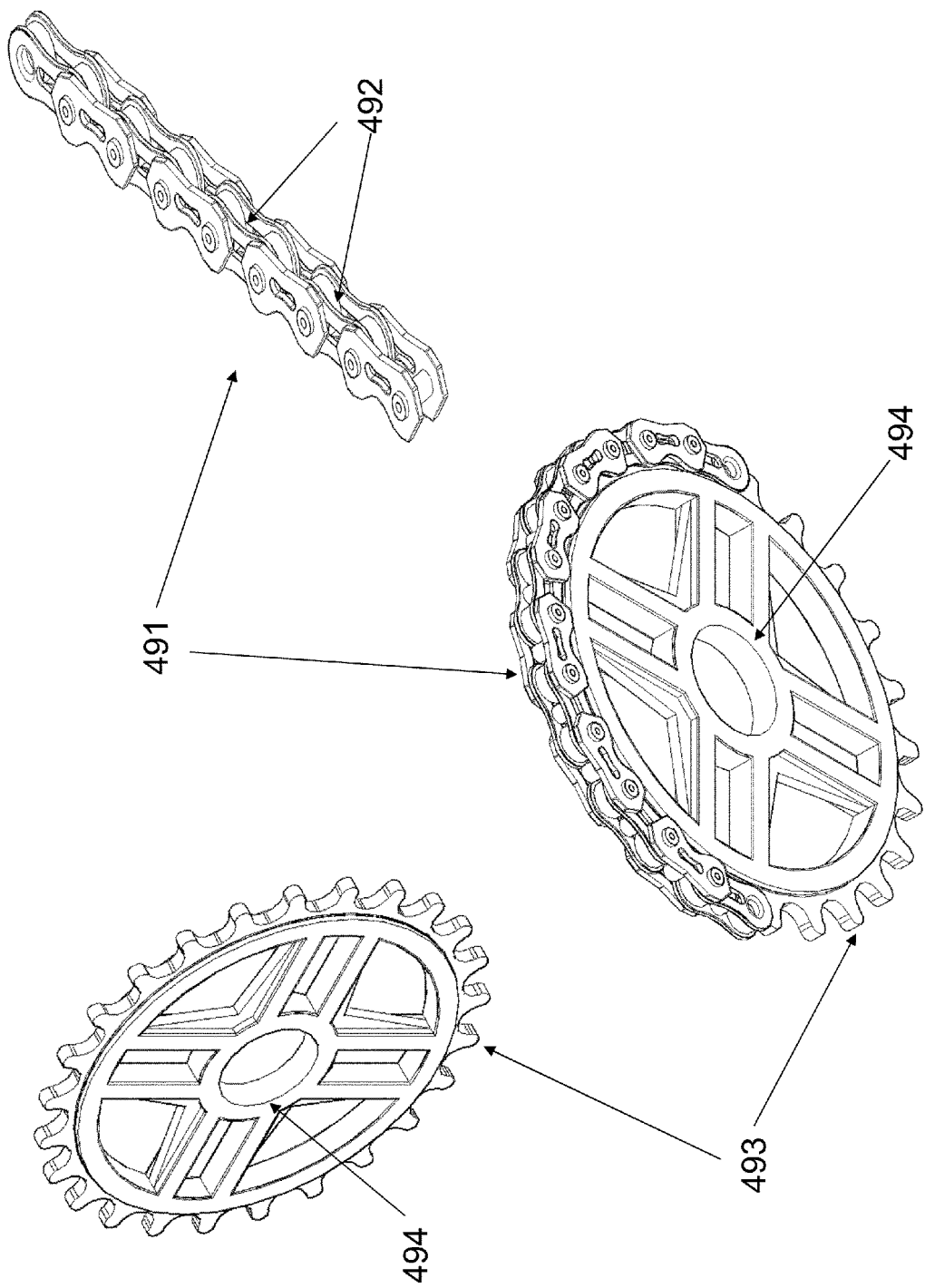

Cable 490 may be realized as a chain that allows for spokes from the wheel assemblies to pass through it (FIG. 4B). The chain 491 includes spacing 492 for receiving spokes 493 from a sprocket 494 associated with a wheel assembly. Chain 491 dressed around sprocket 494 of wheel assembly is adapted to rotate sprocket 494 and thus wheel assembly (not shown) and any associated rotational elements including but not limited to a rotating element of an electrical generator.

Fourth Embodiment

Figure 5:
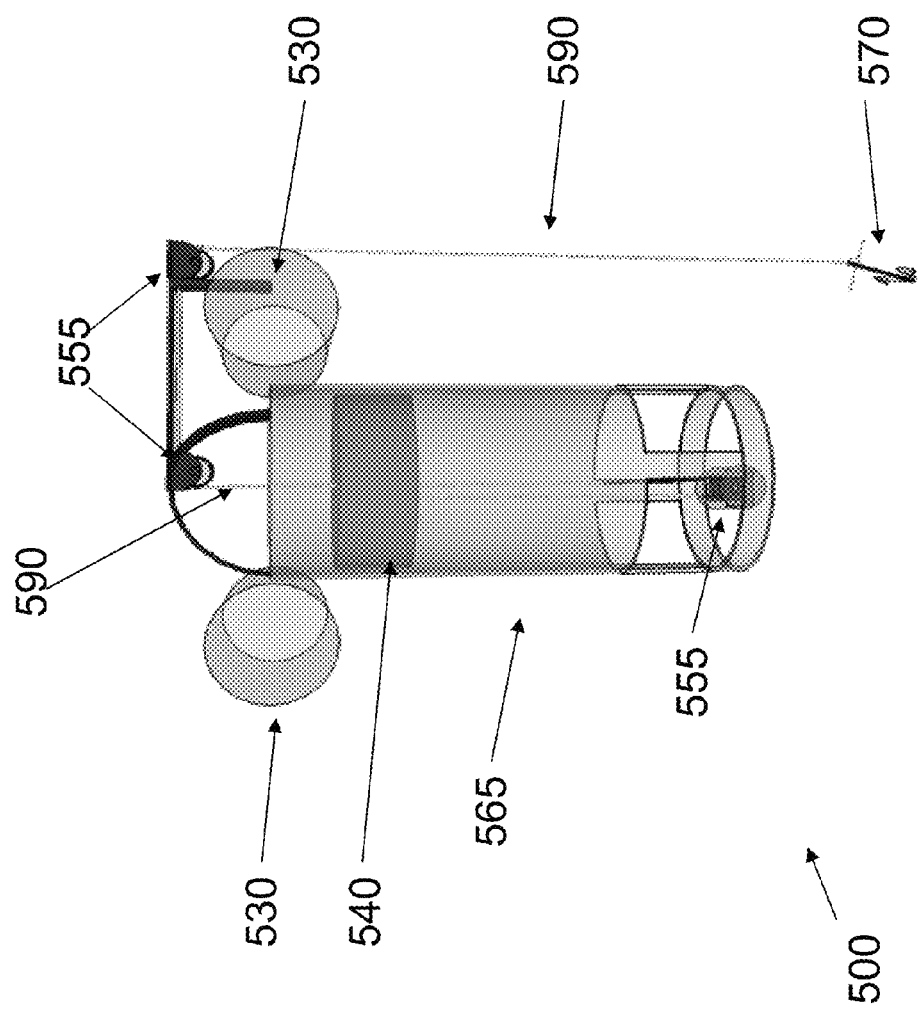
FIG. 5 is a schematic representation of another embodiment of the present invention.

Attention is now turned to FIG. 5 which shows a schematic view of an additional embodiment of the present invention. A wave energy transducer 500 includes a plurality of wheel assemblies 555 which are adapted to be rotated by a cable 590 whose penultimate ends are an anchor 570 and a second flotation element 540 which is half the size or less than a first flotation element 530. Multiple wheel assemblies 555 aid in more efficient cable motion and potentially higher efficiencies of energy conversion between wave motion and rotational energy realized in the wave energy transducer 500.

Fifth Embodiment

Figure 6A:
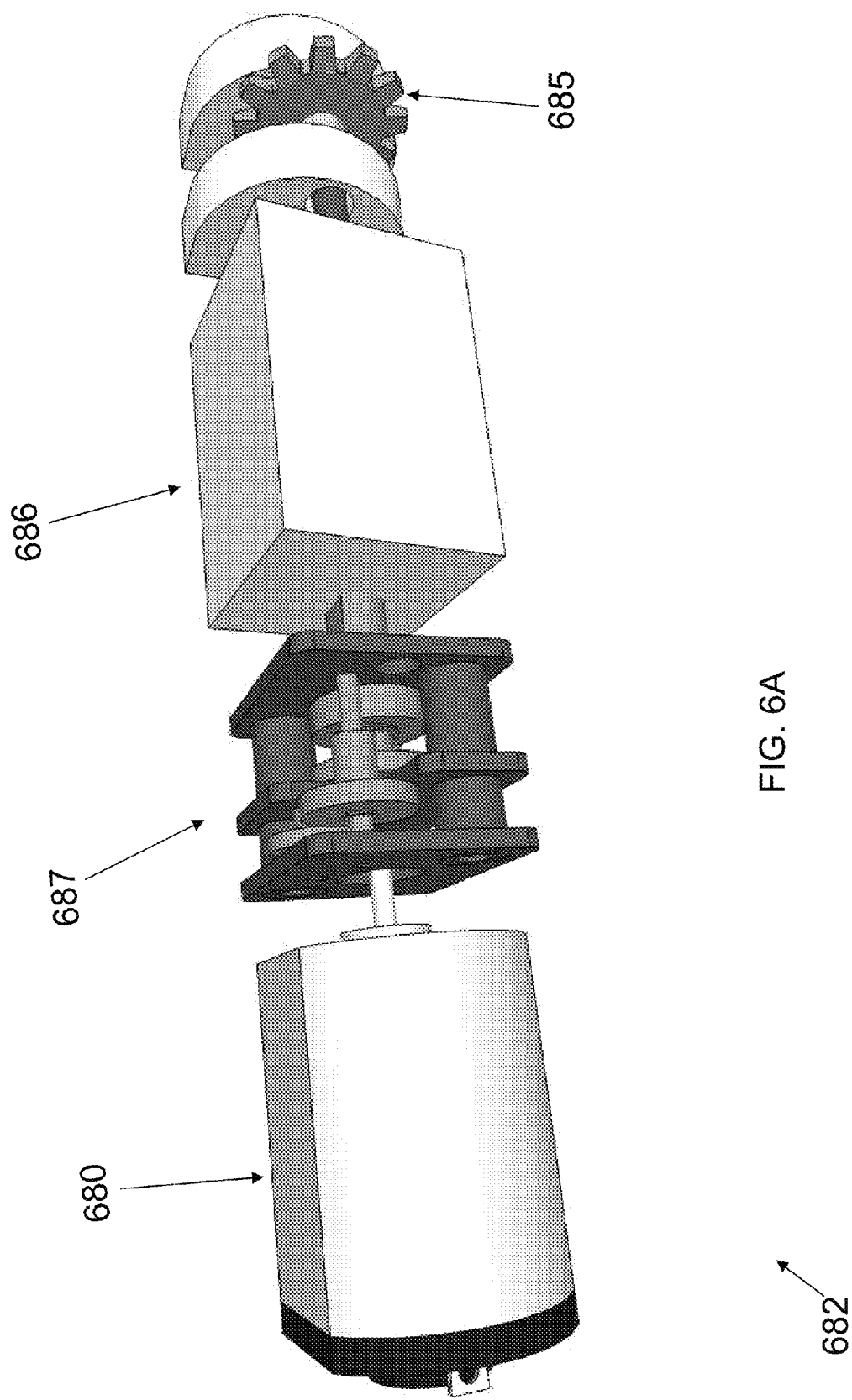
FIG. 6A shows details of an electricity generating module associated with an embodiment of the present invention.

Attention is now turned to FIG. 6A which shows a gear system 682 that may be associated with an embodiment of the present invention. Gear 685 is rotated by chain or cable (not shown for purposes of clarity) as described in previous embodiments. The gear 685 is associated with a two-way to one-way rotation converter 686, as the gear rotates in both clockwise and counterclockwise directions during a single wave pulse. The converter 686 converts all gear 685 rotation into a single direction of rotation for conversion of wave to rotational energy. The converter 686 is connected to a step-up gear 687 that typically has a ratio of 50:1 or 100:1 to increase the percentage of wave energy that is realized as usable rotational energy. Finally, the step-up gear 687 is connected to a motor/generator 680 that can generate electricity through the appropriate rotation of magnet, rotor or the like to allow for production of electricity from rotational energy. The gear system 682 thus takes wave energy via a wheel assembly-associated gear 685 and allows for conversion of said energy into electricity which can be used on-site or transferred elsewhere. Rotation of gear 685 is specifically dependent on wave action as described in the first embodiment of the instant invention.

Figure 6B:
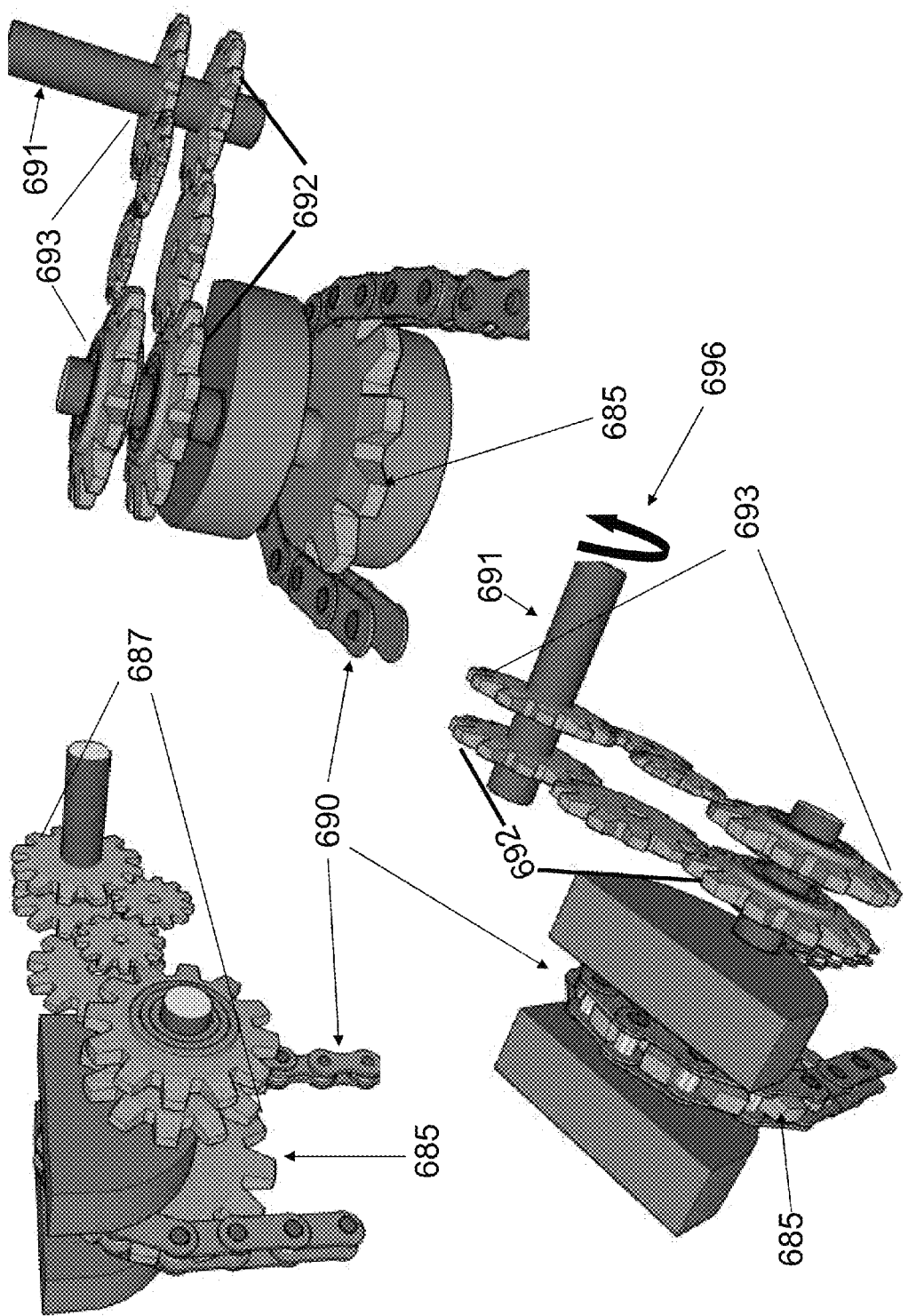
FIG. 6B shows further detail of the mechanism for converting rotational energy to a single direction.

FIG. 6B shows greater detail of the gear 685 function in transduction of wave energy to rotational energy. With movement of flotation elements (not shown), chain 690 rotates gear 685 associated with wheel assembly 655; gear 685 in turn rotates a plurality of gears 687 associated with a backstop freewheel system. As depicted in FIG. 6B, the upper gears 693 rotate shaft 691 only when chain 690 rotates gear 685 in a clockwise direction; lower gears 692 do not function at all. When chain 690 rotates gear 685 in a counterclockwise direction, lower gears 692 rotate shaft 691 in the same direction 696 as before, while upper gears 692 do not function. The plurality of gears 687 aids in efficiently converting the wave-specific rotation of wheel assembly 655 gear 685 into single-direction rotational energy as shown in FIG. 6A.

Sixth Embodiment

Figure 7:
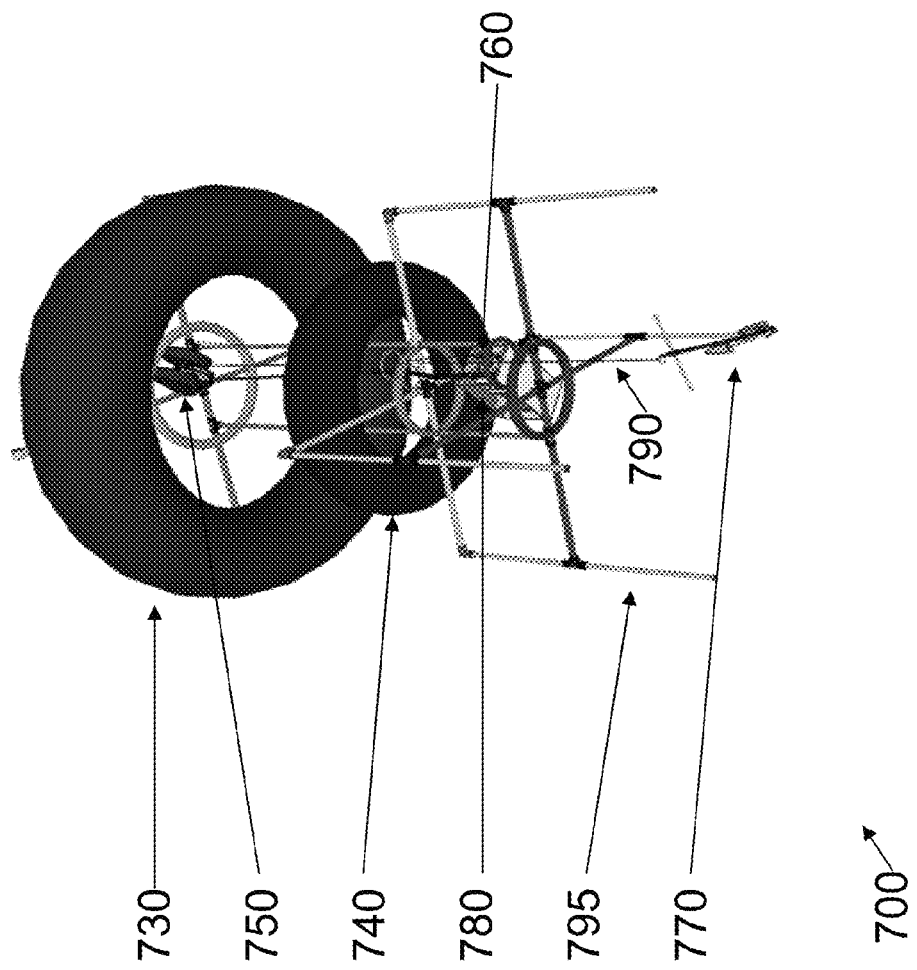
FIG. 7 is a schematic representation of electricity generation according to an embodiment of the present invention.

Attention is turned to FIG. 7 which shows an embodiment of the invention used for production of electricity. A wave energy transducer 700 is shown with separation of first flotation element 730 and second flotation element 740 that occurs when the transducer 700 is lifted by a wave (not shown). Cable 790 attached to an anchoring element rotates a lower wheel assembly 760 which is associated with an electrical generator 780. Electricity generated by the electrical generator 780 is sent by a transmission cable to an electrical grid (not shown). Optional stabilizers 295 are also shown.

Seventh Embodiment

Figure 8:
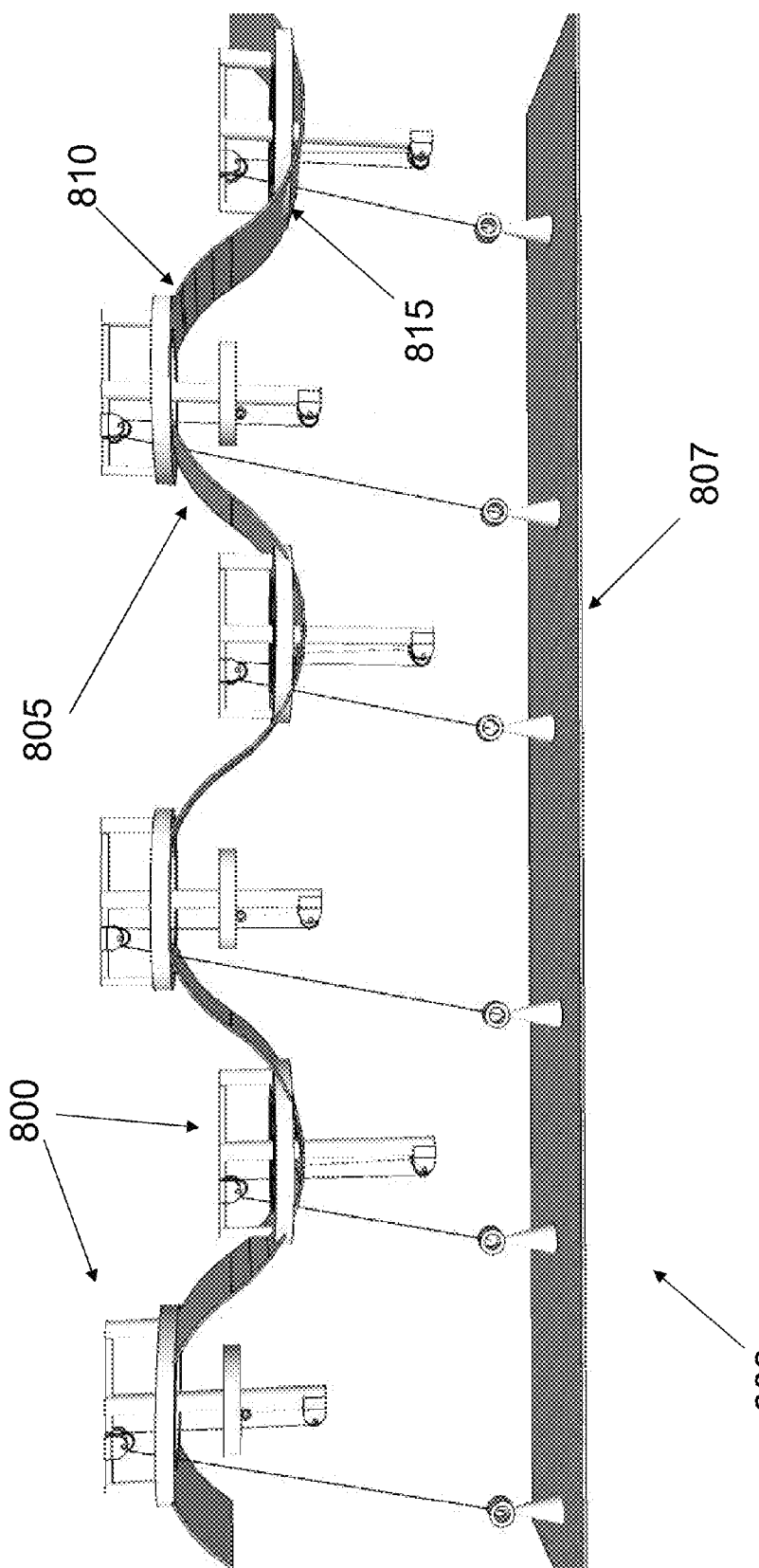
FIG. 8 is a schematic representation of a field of devices according to an embodiment of the present invention for the purpose of generating MW levels of electricity.

Attention is turned to FIG. 8 which shows an embodiment of the present invention. A plurality of wave energy transducers 800 are placed in the sea 805, wherein said transducers 800 are anchored to the seabed 807. Waves passing through the field 802 of transducers 800 will cause the action of each transducer 800 to convert wave energy into rotational energy and optionally into electricity which can be taken from the field 802 with an appropriate set of transmission wires (not shown). Note that different transducers 800 can be in wave crest 810 or trough 815 at the same time.

Eighth Embodiment

Attention is turned to FIG. 9 which shows a schematic view of an embodiment of the present invention. The wave energy transducer 900 includes a weight 977 in place of anchor, said weight either resting on seabed 907 or being suspended in the sea, as a function of the cable 990 length. In such an embodiment, the transducer 900 may be held in place by a separate line 995 or other means. It is assumed that the transducer will remain generally in a single location during the time of its use.

Ninth Embodiment

FIG. 10 shows a method of the present invention. The method includes providing a buoy having a first flotation element including an upper wheel assembly and a lower wheel assembly, the lower wheel assembly being below water level, a second flotation element, smaller than and motion independent of the first flotation element and, a cable, wherein the cable is attached at a first end to the second flotation element and is attached at a second end to a water bed, and wherein the cable is adapted to pass above and rotate said upper wheel assembly and pass beneath and rotate the lower wheel assembly; placing the buoy into a body of water so that the first flotation element and the second flotation element are on the surface of the body of water; anchoring the buoy through the cable to the bed of said body of water; allowing action of waves to raise the first flotation element and concomitantly sink the second flotation element, wherein the motion of the second flotation element allows for the rotation of the upper wheel assembly and the lower wheel assembly; and, allowing action of the waves to lower the first flotation element and concomitantly raise the second flotation element, wherein the motion of the second flotation element allows for the rotation of the upper wheel assembly and the lower wheel assembly.

It is expected that during the life of a patent maturing from this application, additional wave-based energy systems will be developed, and the scope of the term of the invention is intended to include all such new technologies a priori.

As used herein the term "about" refers to ±10%.

The terms "comprises", "comprising", "includes", "including", "having" and their conjugates mean "including but not limited to".

The term "consisting of means "including and limited to".

The term "consisting essentially of" means that the, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. The present invention could be employed for a wide variety of embodiments with differentially sized flotation elements as herewith described.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed:

1. A device for converting wave energy into rotational energy, including the following:
    a first flotation element including an upper wheel assembly and a lower wheel assembly, said lower wheel assembly being below water level during action of said device;
    a second flotation element, smaller than and independent in individual motion of said first flotation element;
    a chain, wherein said chain is attached at a first end to said second flotation element and is adapted to rotate said lower wheel assembly and transfer change in potential energy of said first floatation element to mechanical rotational energy, and said chain further passing the upper wheel assembly; and,
    an anchor, wherein said anchor is attached to a second end of said chain and remains effectively unmoved during the action of said device.

2. The device according to claim 1, wherein said rotational energy is employed in the generation of electricity.

3. The device according to claim 2, wherein said device is a plurality of devices.

4. The device according to claim 1, further including a motor, said motor being associated with a wheel assembly.

5. The device according to claim 1, wherein said anchor sits on a water bed.

6. The device according to claim 1, wherein said device is realized as a buoy.

7. A device for converting wave energy into rotational energy, including the following:
    a first flotation element including an upper wheel assembly and a lower wheel assembly, said lower wheel assembly being below water level during action of said device;
    a second flotation element, smaller than and independent in individual motion of said first flotation element;
    a chain, wherein said chain is attached at a first end to said second flotation element and is adapted to rotate said upper wheel assembly and transfer change in potential energy of said first floatation element to mechanical rotational energy, and wherein said chain is attached at a second end to the sea floor.

8. The device according to claim 7, wherein said cable is attached to a cement block on said sea floor.

9. The device according to claim 7, wherein said device is used in the production of electricity.

10. The device according to claim 7, wherein said rotational energy is employed in the compression of liquid or gas.

11. The device according to claim 7, wherein said device could be part of a raft or ship.

12. The device according to claim 4, further including an electrical system for local off-grid uses.

13. The device according to claim 4, further including a light and adapted for use as lighthouse or marking buoy.

14. The device according to claim 1 wherein said device includes a gear system to convert turns of said wheels to larger turns of a component associated with a motor.

15. The device according to claim 4, wherein there is a load on a shaft associated with said motor.

16. The device according to claim 4, wherein there is no load on said motor.

17. A method for converting wave energy to rotational motion, including the following:
  providing a buoy having a first flotation element including an upper wheel assembly and a lower wheel assembly, said lower wheel assembly being below water level, a second flotation element, smaller than and motion independent of said first flotation element and, a cable, wherein said cable is attached at a first end to said second flotation element and is attached at a second end to a water bed, and wherein said cable is adapted to pass above and rotate said upper wheel assembly and pass beneath and rotate said lower wheel assembly;
  placing said buoy into a body of water so that said first flotation element and said second flotation element are on the surface of said body of water;
  anchoring said buoy through said cable to said bed of said body of water;
  allowing action of waves to raise said first flotation element and concomitantly sink said second flotation element, wherein the motion of said second flotation element allows for the rotation of said upper wheel assembly and said lower wheel assembly; and,
  allowing action of said waves to lower said first flotation element and concomitantly raise said second flotation element, wherein the motion of said second flotation element allows for the rotation of said upper wheel assembly and said lower wheel assembly.

18. The method according to claim 17, furthering including the step of generating electricity from said rotation of said upper wheel assembly and said lower wheel assembly.

19. The method according to claim 17, wherein said cable may be comprised of a cable and a chain in a row.

20. The method according to claim 17, wherein there is further included a system adapted to convert rotation in two directions to rotation in a single predetermined direction rotation.

* * * * *